United States Patent Office 3,278,392
Patented Oct. 11, 1966

3,278,392
WATER INSOLUBLE ENZYMES
Abraham Patchornik, Ness-Ziona, Israel, assignor to Yeda Research and Development Co., Ltd., Rehovoth, Israel, a company of Israel
No Drawing. Filed Nov. 7, 1963, Ser. No. 322,030
Claims priority, application Israel, Nov. 12, 1962, 18,207
2 Claims. (Cl. 195—63)

It is an object of the present invention to provide a novel process for the production of enzymatically active water-insoluble carrier-bound enzymes. It is a further object of the present invention to provide carrier-bound enzymes. It is yet a further object of the present invention to provide an enzymatically active substance comprising enzymes bound to cellulose. Other and further objects of the invention will become apparent hereinafter.

United States Patent 3,167,485 described enzymatically active substances comprising enzymes bound to polymeric carriers. According to the present invention there is provided a very simple and convenient method for the preparation of enzymatically active water-insoluble substances consisting of enzyme molecules bound via functional groups of the enzyme molecules which are not necessary to the enzymatic activity, to cellulose. The linkage according to the present invention is accomplished by first preparing bromoacetyl cellulose (BAC) and by binding thereto molecules of enzymes through sulphhydryl groups or through α or ε-amino groups of the enzyme molecules, or through the imidazole group of histidine. The novel compounds according to the present invention can be represented by the general formula

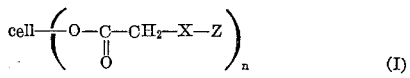
(I)

where "cell" designates cellulose, X designates a member of the group consisting of —NH—, —S—, imidazole and Z designates a molecule of the enzyme whereof the —S—,

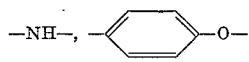

or

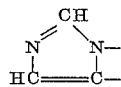

groups form part.

The novel compounds of Formula I are prepared by reacting cellulose in any desired form (powder, sheets, etc.) with bromoacetyl bromide, resulting in a compound of the general formula:

cell+n-Br—CO—CH$_2$—Br→cell-(O—CO—CH$_2$—Br)$_n$ which is subsequently reacted with a suitable enzyme, having functional groups adapted to result in a covalent bonding of said enzyme molecules without destruction of the enzymatic activity, resulting in compounds of the general Formula I.

The bonding reaction may be represented by:

cell-(—OCOCH$_2$Br)$_n$ + mHX—Z ⟶

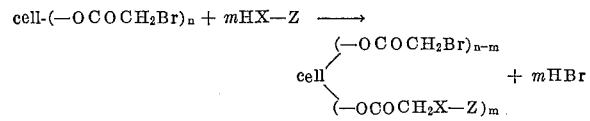

where X and Z have the same meaning as above.

A better understanding of the invention may be had by referring to the following examples, which are illustrative only.

EXAMPLE I

*Preparation of water-insoluble trypsin*

STAGE A.—PREPARATION OF BROMOACETYL CELLULOSE (BAC)

*Procedure I.*—A mixture of 30 g. cellulose powder ("genuine Whatman cellulose powder, standard grade"), 300 g. of bromoacetic acid, and 80 ml. of dioxane was stirred overnight at ambient temperature. Then, 75 ml. of bromoacetyl bromide were added and the mixture was stirred at room temperature during 8 hours. A viscous solution was obtained, and part of the cellulose dissolved. This mixture was poured into 2 l. of a water/ice mixture and the white precipitate formed was washed several times with water, with 0.6 N potassium bicarbontae and again with water. A yield of 33 g. of BAC-I was obtained, which contained 20.1% weight of bromine (i.e. on the average 0.6 bromoacetyl residue per glucose unit).

*Procedure II.*—A mixture of 5 gr. cellulose powder, 100 gr. bromoacetic acid, 100 gr. bromoacetyl bromide and 40 ml. dioxane was shaken for 130 hours at 50° C. The liberated HBr was continuously removed by passing a stream of nitrogen through the reaction mixture, thus avoiding extensive degradation of the cellulose. A yield of 7.7 gr. of BAC-II containing 32.5% Br (i.e. on the average 1.3 bromoacetyl residues per glucose unit) was collected. The product was found to be readily soluble in a variety of organic solvents including acetone, dioxane, dimethylformamide and dimethylsulfoxide.

STAGE B.—COUPLING OF TRYPSIN 1 mg. trypsin (50% MgSO$_4$, N.B.C. "for chemical and investigational use" grade) were stirred for 3 minutes with 1 g. of BAC-I (previously homogenized), in 50 ml. of veronal buffer (0.06 molar) of pH 8.6. The preparation (Tryp-BAC-I) was centrifuged off and washed 7 times with water. Almost all of the trypsin was bonded to the carrier.

In another experiment coupling of trypsin with BAC-II was carried out in 45% solution of acetone in veronal buffer of pH 8.6. Total nitrogen analysis of the water-insoluble derivative (Tryp-BAC-II) showed that 100 mg. of BAC-II bound 27 mg. of trypsin.

*Examination of activity of carrier-bound trypsin*

A. TOWARDS LOW-MOLECULAR WEIGHT SUBSTRATES

The activity of Tryp-BAC-I was examined towards 5 mg. of L-lysine ethyl ester dissolved in 5 ml. of water at pH 6 by titration with a pH-stat titrator model TTT–1 with automatic recording. It was found that 100 mg. insoluble Tryp-BAC-I had an activity corresponding to that of 60–70 mg. native trypsin (i.e. the trypsin bound was 60–70% active).

The activity of Tryp-BAC-II was similarly examined towards 5 mg. of benzoyl-L-arginine ethyl ester dissolved in 5 ml. of water at pH 6. It was found that 100 mg. of Tryp-BAC-II had an activity corresponding to that of 4.2 mg. of native trypsin.

B. TOWARDS HIGH-MOLECULAR WEIGHT SUBSTRATES

The activity of Tryp-BAC-I towards casein was examined according to Kunitz (M. Kunitz, J. Gen. Physiol. 30, 291 (1947)). The activity of 100 mg. of Tryp-BAC-I was equivalent to that of 23 mg. of native trypsin.

Enzymatic activity of Tryp-BAC-I did not deteriorate during 3 months of storage provided coupling was followed by treatment with enough mercapto-ethanol to react with uncoupled bromo-groups.

EXAMPLE II

*Preparation of carrier-bound chymotrypsin*

500 mg. of homogenized BAC-I were stirred for 4 minutes with 10 mg. of chymotrypsin dissolved in 40 ml. of veronal buffer (0.06 molar) of pH 8.6 and 60 ml. of water. The preparation (Chym-BAC-I) was centrifuged off and washed 7 times with water. Chym-BAC-I was found to be 45% active towards L-tyrosine ethyl ester. Enzymatic activity of Chym-BAC-I did not deteriorate during 3 months of storage provided coupling was followed by treatment with enough mercapto-ethanol to react with uncoupled bromo-groups.

EXAMPLE III

*Preparation of carrier-bound ribonuclease*

To 50 mg. of BAC-I in 10 ml. 0.1 molar sodium phosphate there was added 10 mg. ribonuclease. The reaction mixture was stirred during 16 hours at a temperature of 4° C. After washing five times with 0.2 molar sodium acetate (pH 6.0) and twice with water, the remaining bromine groups were removed by reaction with mercapto-ethanol. The enzymatic activity was tested towards cytidine 2′,3′-cyclic phosphate and RNA, and compared with native ribonuclease. The activity towards the first substrate was equivalent to that of 750γ of the native enzyme, while towards the second substrate it was equivalent to 600γ.

The activity of the insoluble enzymatic preparation did not deteriorate during 3 months of storage, provided coupling was followed by treatment with enough mercapto-ethanol to react with uncoupled bromo-groups.

EXAMPLE IV

STAGE A.—PREPARATION OF IODOACETYL CELLULOSE (IAC)

Bromoacetyl cellulose was prepared according to the method of Example 1. To 100 mg. of bromoacetyl cellulose, containing 5.9% bromine, there were added 600 mg. of sodium iodide, 5 ml. of 95% ethyl alcohol and the mixture was shaken overnight at ambient temperature. The solid was filtered off, washed with alcohol, aqueous bicarbonate, water, alcohol and ether and dried. The product contained 9.5% iodine by weight.

STAGE B.—COUPLING WITH MODEL-COMPOUNDS

The coupling with mercapto-ethanol, phenylalanine, and polylysine took place at pH 6.0, 7.0 and 8.9, respectively. The rate and extent of the reactions were followed using a pH-stat.

What I claim is:

1. An enzymatically active, water insoluble substance comprising trypsin, chymotrypsin or ribonuclease bonded to cellulose through the linkage wherein X is a functional group of the enzyme molecule not essential for the enzymatic activity thereof and is —NH—, —S—,

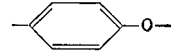

or

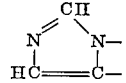

2. A process for the preparation of an enzymatically active, water insoluble substance comprising trypsin, chymotrypsin or ribonuclease bonded to cellulose through the linkage wherein X is a functional group of the enzyme molecule not essential for the enzymatic activity thereof and is —NH—, —S—,

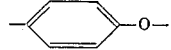

or

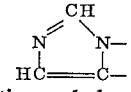

which comprises reacting a haloacetyl cellulose having the formula

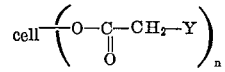

wherein "cell" is cellulose and Y is bromo or iodo, with an enzyme having the formula

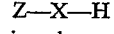

wherein Z is the trypsin, chymotrypsin or ribonuclease residue and X is the functional group defined above, to produce said substance.

References Cited by the Examiner

Mitz et al.: Journal of the American Chemical Society, vol. 1, pp. 4024–4028 (1959).

A. LOUIS MONACELL, *Primary Examiner.*

L. M. SHAPIRO, *Assistant Examiner.*